United States Patent
Kujawa et al.

(10) Patent No.: US 10,684,900 B2
(45) Date of Patent: Jun. 16, 2020

(54) ENHANCED MESSAGE CONTROL BANKS

(71) Applicants: Edward J Kujawa, Roseville, MN (US); Brian L McElmurry, Roseville, MN (US); Joseph P Peterson, Roseville, MN (US); Sandra G Wierdsma, Roseville, MN (US); Jerome G Strobeck, Rosevile, MN (US)

(72) Inventors: Edward J Kujawa, Roseville, MN (US); Brian L McElmurry, Roseville, MN (US); Joseph P Peterson, Roseville, MN (US); Sandra G Wierdsma, Roseville, MN (US); Jerome G Strobeck, Rosevile, MN (US)

(73) Assignee: Unisys Corporation, Blue Bell, PA (US)

(*) Notice: Subject to any disclaimer, the term of this patent is extended or adjusted under 35 U.S.C. 154(b) by 354 days.

(21) Appl. No.: 14/994,446

(22) Filed: Jan. 13, 2016

(65) Prior Publication Data

US 2017/0199701 A1    Jul. 13, 2017

(51) Int. Cl.
*G06F 15/16* (2006.01)
*G06F 9/54* (2006.01)

(52) U.S. Cl.
CPC .................... *G06F 9/544* (2013.01)

(58) Field of Classification Search
USPC ............... 709/219; 710/22, 23; 714/32, 718; 711/154; 707/813; 718/102, 104
See application file for complete search history.

(56) References Cited

U.S. PATENT DOCUMENTS

| | | | | |
|---|---|---|---|---|
| 4,482,951 A * | 11/1984 | Swaney | .................. | H04L 29/06 710/23 |
| 7,065,676 B1 * | 6/2006 | Lang | .................... | G06F 11/3414 714/32 |
| 7,711,920 B2 * | 5/2010 | Borman | .............. | G06F 12/0269 707/813 |
| 8,938,598 B2 * | 1/2015 | Jones | ........................ | G06F 9/52 718/104 |
| 9,619,313 B2 * | 4/2017 | Stark | ...................... | G06F 11/073 |
| 2010/0179865 A1 * | 7/2010 | Lundqvist | .......... | G06Q 30/0241 709/219 |
| 2012/0166683 A1 * | 6/2012 | Bowler | ................... | G06F 13/28 710/22 |

(Continued)

*Primary Examiner* — Quang N Nguyen

(57) ABSTRACT

A server system may be configured to access a first contiguous portion of memory for a first activity of a plurality of activities, and to transfer data associated with the first activity into the first contiguous portion of memory. The first contiguous portion of memory may be placed in a memory repository to make the first contiguous portion of memory available for access by at least a second activity of the plurality of activities, and an identifier may be assigned to the first contiguous portion of memory placed in the memory repository. The server system may also be configured to access the first contiguous portion of memory for the second activity, and to transfer the data associated with the first activity from the first contiguous portion of memory to memory specifically associated with the second activity.

9 Claims, 8 Drawing Sheets

(56) References Cited

U.S. PATENT DOCUMENTS

| | | | |
|---|---|---|---|
| 2012/0331470 A1* | 12/2012 | Jones | G06F 9/52 |
| | | | 718/102 |
| 2014/0310484 A1* | 10/2014 | Giroux | G06F 12/08 |
| | | | 711/154 |
| 2015/0279483 A1* | 10/2015 | Weksler | G11C 29/18 |
| | | | 714/718 |
| 2016/0371139 A1* | 12/2016 | Stark | G06F 11/0787 |
| 2017/0123707 A1* | 5/2017 | Carey | G06F 13/4282 |
| 2017/0242602 A1* | 8/2017 | Demchenko | G06F 9/4856 |

\* cited by examiner

ENHANCED MESSAGE CONTROL BANKS

FIELD OF THE DISCLOSURE

The instant disclosure relates to computer networks. More specifically, this disclosure relates to sharing of data in computer networks.

BACKGROUND

A bank is a contiguous portion of computer memory containing instructions, data, or both. Banks may be used as units of addressing and program protection. Programs within an application often see each bank as occupying a band of relative addresses. When a program seeks to use a particular bank, the program bases the bank, whereby a mapping is provided between relative addresses specified by the bank and absolute addresses. The hardware within a server may provide special "base registers" to provide the mapping between relative addresses and absolute addresses. In conventional systems, every memory reference uses a base register.

An operating system may manage banks by placing them in memory when requested by an application. For example, a Message Control Bank (MCB) is a protected server subsystem that implements message queues for transaction processing with the banks. The MCB communicates with a transaction scheduler in the operating system. The MCB also provides the APIs for applications to send and receive messages from the message queues. As server functions are increasing, the number of transactions processed by a server also increase. For example, database servers may process thousands of transactions per second. As the functionality of servers and the number of transactions processed by servers continue to rapidly increase, the drawbacks of conventional MCBs are becoming more apparent.

Conventionally, MCBs operate in a base mode of an operating system. The primary drawbacks with these conventional MCBs that operate as basic mode products center around their mechanisms for controlling temporary storage of message data and for controlling how data is shared between multiple programs in an application or multiple activities within the programs. For example, a conventional MCB often suffers from limited addressing because the banks used for conventional MCBs have a relatively small size while the demand for more and larger messages to be stored in the banks continues to increase. The size and number of messages that can be stored using conventional MCBs are limited. In conventional MCBs, a small message is stored in one single small block within one bank. A larger message is stored in multiple blocks within one bank. A conventional MCB employs a paging algorithm when the supply of these blocks is depleted. A used block is selected and its contents are written to a Memory Retention File (MRF) and that block of memory is made available for reuse. When the data formerly held in that block of memory are needed, that data must be read back into memory from the MRF, possibly using a different block in memory, and possibly requiring another invocation of the paging algorithm to make a memory block available. This paging comes with a performance penalty due primarily to the I/O overhead. Using multiple banks provides some relief, but there can be only a few such banks in one MCB. Even with the maximum permitted banks, the memory space for these messages is sometimes inadequate.

SUMMARY

An MCB may be implemented as an extended MCB (MCBX) with source code written at least partly in C. The MCBX may be a protected fixed-gate shared subsystem (FGSS), and may be written as an extended mode (EM) subsystem product having access to a wider span of memory addresses. This provides better protection from improper access, greater flexibility, greater capacity, and opportunity for future enhancement. For example, an MCBX may use memory queue banks (QBs) to transfer data and for internal temporary storage, transfer, and sharing of message data. The number of available QBs in an MCBX can be much larger than the finite number of banks that are designated for sharing by multiple programs in conventional MCBs. In addition, one QB may be more than sufficient to hold a complete transaction message of maximum size. Therefore, the number and size of messages that can be stored in MCB may be significantly increased in an MCBX. By storing messages of maximum size in a single QB as opposed to the conventional storage described in the previous paragraph, the complexity associated with storing messages is reduced because all text for a message is contiguous and there is no need for the old logic of linking together separate parts of a message. Furthermore, the I/O overhead from paging is eliminated. As a result, the overall maintainability of the software is enhanced. In addition to QBs, an MCBX may use a queue bank repository (QBR) to share data between multiple programs in an application or multiple activities within the programs. The QBR can contain over 4 million QBs at one time.

According to one embodiment, a method may include accessing, by a server, a first contiguous portion of memory for a first activity of a plurality of activities. The method may include transferring, by the server, data associated with the first activity into the first contiguous portion of memory. The method may also include placing, by the server, the first contiguous portion of memory in a memory repository to make the first contiguous portion of memory available for access by at least a second activity of the plurality of activities, and assigning, by the server, an identifier to the first contiguous portion of memory. The method may further include accessing, by the server, the first contiguous portion of memory for the second activity, and transferring, by the server, the data associated with the first activity from the first contiguous portion of memory to memory specifically associated with the second activity.

According to another embodiment, a computer program product may include a non-transitory computer readable medium comprising code to perform the steps of accessing a first contiguous portion of memory for a first activity of a plurality of activities and transferring data associated with the first activity into the first contiguous portion of memory. The medium may also include code to perform the steps of placing the first contiguous portion of memory in a memory repository to make the first contiguous portion of memory available for access by at least a second activity of the plurality of activities, and assigning an identifier to the first contiguous portion of memory. The medium may further include code to perform the steps of accessing the first contiguous portion of memory for the second activity, and transferring, by the server, the data associated with the first activity from the first contiguous portion of memory to memory specifically associated with the second activity.

According to yet another embodiment, an apparatus may include a memory, and a processor coupled to the memory. The processor may be configured to execute the steps of accessing a first contiguous portion of memory for a first activity of a plurality of activities and transferring data associated with the first activity into the first contiguous portion of memory. The processor may also be configured to execute the steps of placing the first contiguous portion of memory in a memory repository to make the first contiguous portion of memory available for access by at least a second activity of the plurality of activities, and assigning an identifier to the first contiguous portion of memory. The processor may be further configured to execute the steps of accessing the first contiguous portion of memory for the second activity, and transferring, by the server, the data associated with the first activity from the first contiguous portion of memory to memory specifically associated with the second activity.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
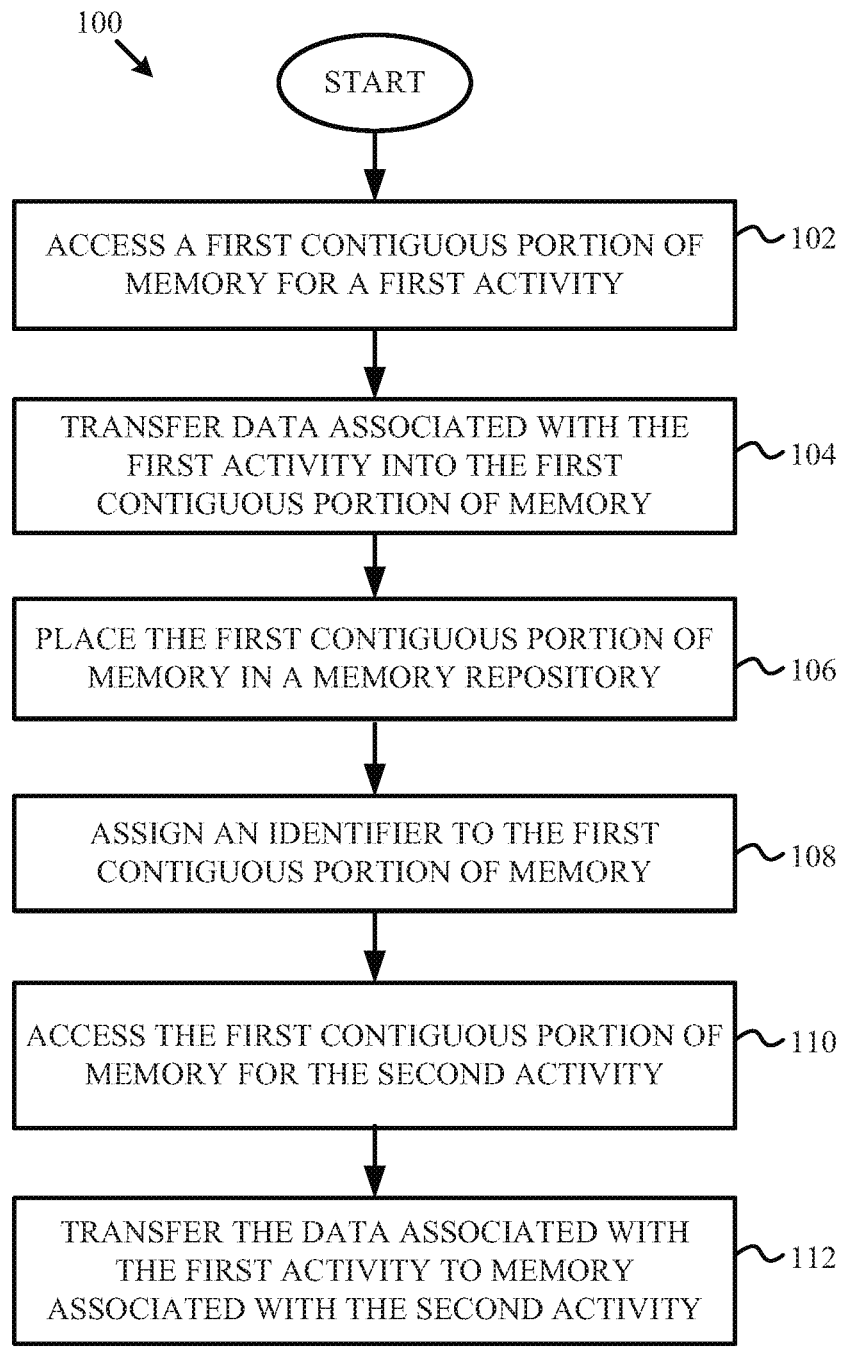
FIG. 1 is a flow chart illustrating a method for internal temporary storage, transfer, and sharing of message data according to one embodiment of the disclosure.

FIG. 1 is a flow chart illustrating a method 100 for internal temporary storage, transfer, and sharing of message data according to one embodiment of the disclosure. In some embodiments, a server system may implement the method with a message control component, such as an MCBX. The MCBX may be a protected fixed-gate shared subsystem (FGSS) for enhanced access control and data security, and may be written as an extended mode (EM) subsystem product having access to a wider span of memory addresses. The MCBX systems may also implement alternate file common banks (AFCBs) to allow basic mode programs to access the MCBX subsystem. The MCBX systems may be backwards compatible with MCB systems. Therefore, in some embodiments basic mode and extended mode addressing may be employed with an MCBX. Interfaces to the MCBX may include an EM packet interface for application programs, an EM packet interface for Communications Systems Management System (CMS) programs, a BM packet interface for application programs, a BM packet interface for CMS programs, a BM compool-compatible primitives interface for application programs, a BM interfaces for IRU short and long recovery, a BM register interface for a universal data system (UDS) to report end-of-step, an EM interface for integrated recovery units (IRY), and an EM interface for a UDS.

MCBX may also use a QB and a QBR to store messages in extended mode (EM) memory, in addition to basic mode (BM) buffers. MCBX may be easy to configure and install. MCBX configuration may be removed and may be controlled by a configuration and installation utility in an operating system. Through MCBX's use of a FGSS, fewer configuration parameters may be required to specify bank descriptor indexes (BDIs) and to define buffer pools.

MCBX may expand the capacity of MCB by providing virtually unlimited resources for transaction access and message creation. This may be accomplished with the use of the QB and the QBR. One QB may store an entire message of up to and exceeding 262K bytes, and the QBR may hold up to and exceeding 4 million QBs. According to one embodiment, memory consumed by MCBX may be acquired, expanded, and/or contracted at runtime.

MCBX may execute in EM as part of a protected FGSS. Each MCBX (one per application group) may have a subsystem installed by the configuration utility. EM may provide a slightly changed instruction set and more bank basing registers, and may provide a modified memory addressing scheme while preserving compatibility with the BM. Traditional programming environment (TPE) BM application programs and CMS programs may gain access to the MCBX subsystem by accessing a pair of AFCBs that translate from the TPE to a new programming environment (NPE) transition.

MCBX may reduce I/O overhead by reducing the number of I/O operations when writing or reading messages to or from a message retention file (MRF). MCBX may write or read multiple consecutive MRF blocks in one operation. MCBX may allocate MRF space after the entire message is staged in a QB and allocates bank space such that blocks may be stored consecutively.

MCBX commands may include three categories. Each category may have a different means of entering the command and means of delivering responses to the commands. A first category may be action commands, which may be MCBX commands entered from a terminal with an open transaction interface package (TIP) connection. Action commands may be entered as normal transaction input, but MCBX may distinguish them from transaction messages by a special character, such as a beginning '$' character. An MCBX background program may process action commands and send responses as TIP output messages to the originating terminal. A second category may be console commands, which may be MCBX commands that may be entered from a system console or from a demand terminal. Each console command may be preceded by a keyin-name. The MCBX background run may receive the command from an operating system and send a response back to the originating console. Examples of console command inputs include "MCB3JWC $STATUS" and "*MCB3A $STATUS," where "MCB3JWC" is a keyin-name configured on the server system and "MCB3A" is the run-id of the current MCBX background run. A third category may be QUTIL commands, which may be MCBX commands entered as input to a QUTIL utility program. The QUTIL program may process the commands without accessing the MCBX subsystem. QUTIL may send responses to the screen of the demand run where QUTIL is executed, or to a file for a batch run.

Figure 2A:
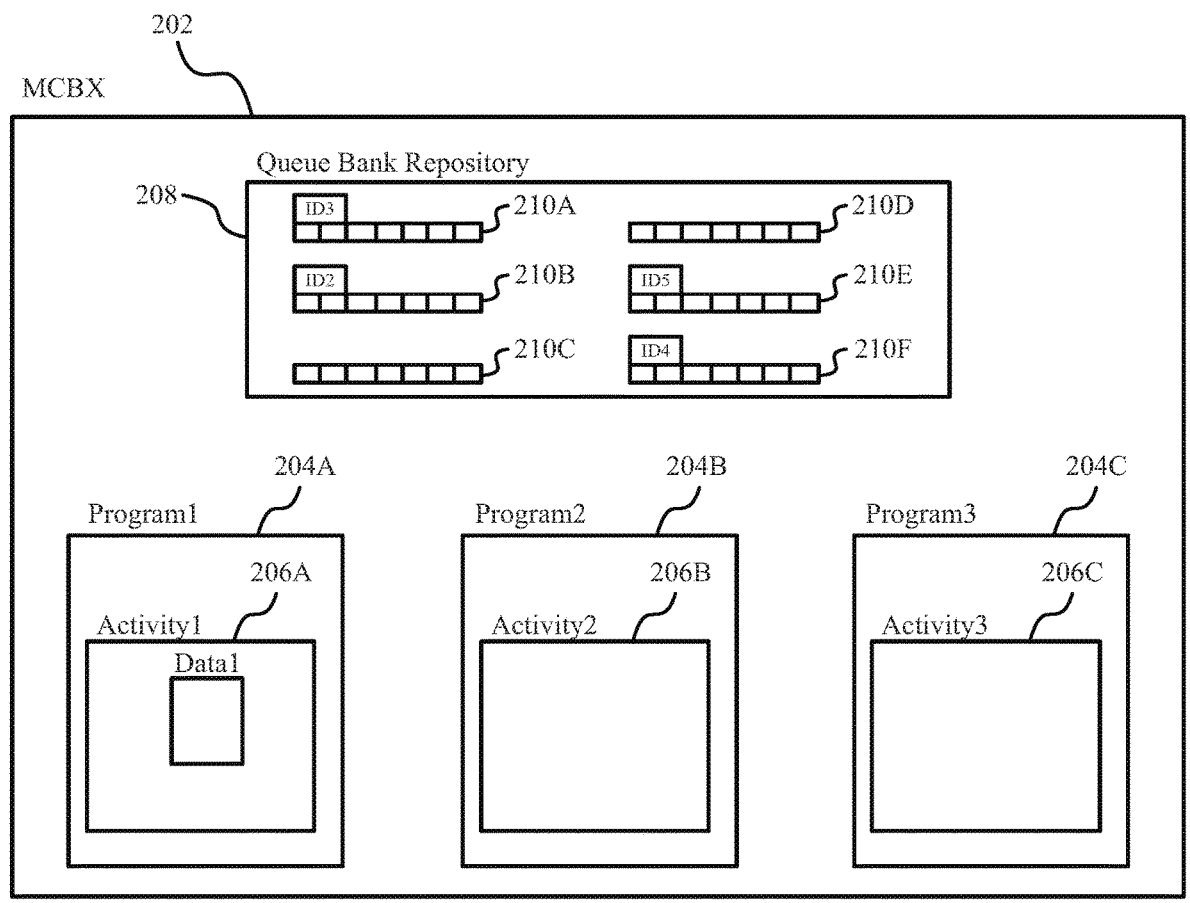
FIGS. 2A-2D are schematic block diagrams illustrating actions for internal temporary storage, transfer, and sharing of message data according to one embodiment of the disclosure.

Returning to FIG. 1, a method 100 for internal temporary storage, transfer, and sharing of message data begins at block 102 with accessing, by a server system, a first contiguous portion of memory for a first activity of a plurality of activities. According to one embodiment, the first contiguous portion of memory may be a Q-Bank (QB) and the plurality of activities (otherwise referred to as threads) may all be associated with one executing program or multiple executing programs. An MCBX application may include a plurality of programs, and each of the programs may have a plurality of activities. To illustrate one embodiment of this inter-relationship and different features of method 100, FIGS. 2A-2D are schematic block diagrams illustrating actions for internal temporary storage, transfer, and sharing of message data according to some embodiments of the disclosure. An MCBX application 202 may include a single program 204A or a plurality of programs, such as programs 204A-C. Each program 204 may include a single activity or a plurality of activities. FIG. 2A illustrates one embodiment, in which each program 204A, 204B, and 204C includes a single activity 206A, 206B, and 206C, respectively. The first portion of memory accessed at block 102 by the server for the first activity may be any available QB. An available QB may be a QB, either within a QBR or outside the QBR, that does not contain data and/or has not been assigned an identifier associating its content to a particular activity or program. For example, QBR 208 may include a single QB 210A or a plurality of QBs, such as QBs 210A-F. QBs 210A, 210B, 210E, and 210F may not be available QBs because they each have identifiers associated with them. QBs 210C and 210D may not contain data, and hence may be available QBs for access by the server for a first activity. Therefore, as an example of block 102, a server may access a first contiguous portion of memory, such as QB 210C, for a first activity, such as activity 206A, of a plurality of activities, such as activities 206.

Figure 2B:
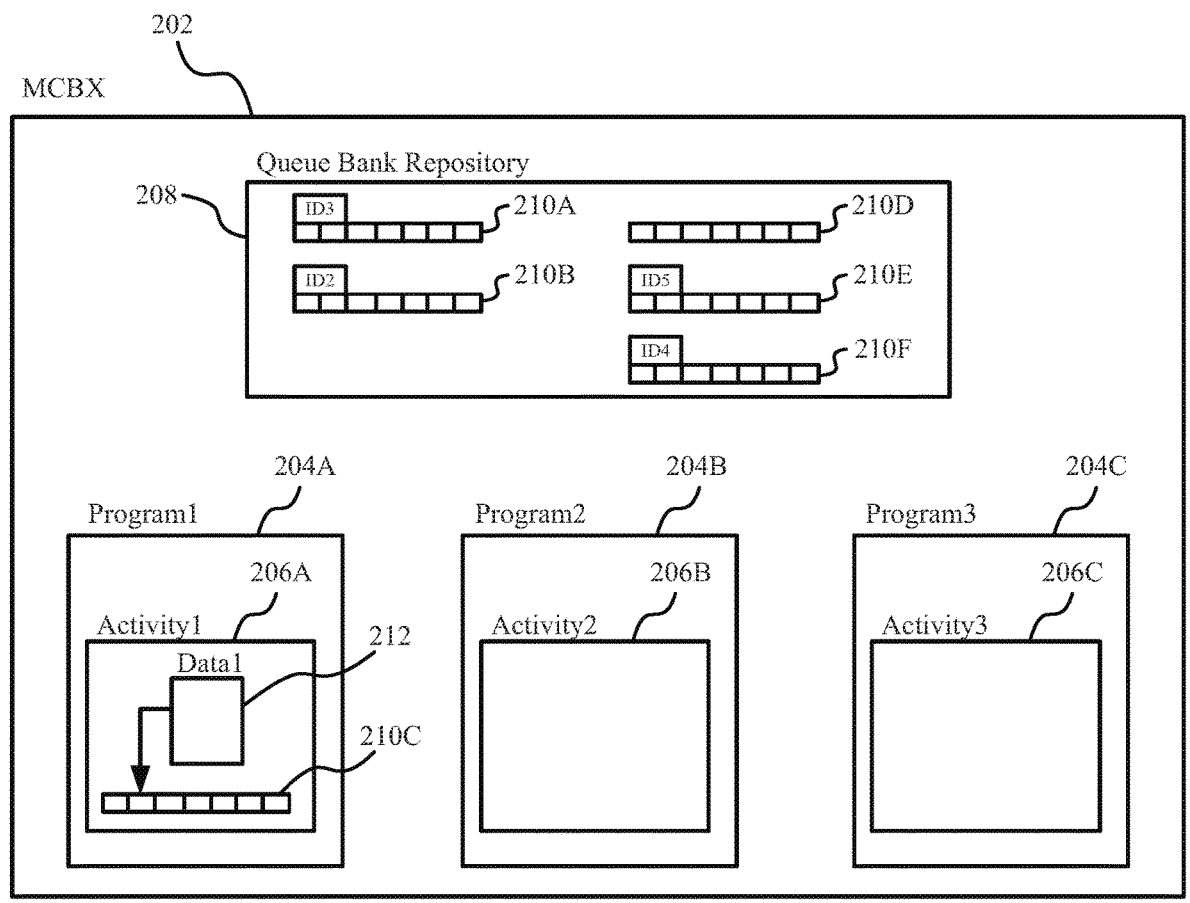

At block 104, a server may transfer data associated with the first activity into the first contiguous portion of memory. For example, FIG. 2B provides an illustration in which the first contiguous portion of memory, such as QB 210C, may be associated with the first activity, such as activity 206A, and data associated with the first activity, such as data 212, may be transferred to the first contiguous portion of memory, such as QB 210C. In one embodiment, the data transferred into the first contiguous portion of memory at block 104 may include a complete message or a portion of a message. Because a QB 210 may hold a complete message, no portion of a message, or any other type of data held by the QB 210, may need to be transferred to a hard disk prior to transferring data associated with an activity into the QB 210. Consequently, the I/O overhead may be reduced by allowing the QB 210 to hold a complete message and not requiring transfer of data to a hard disk to free up the QB 210.

Figure 2C:
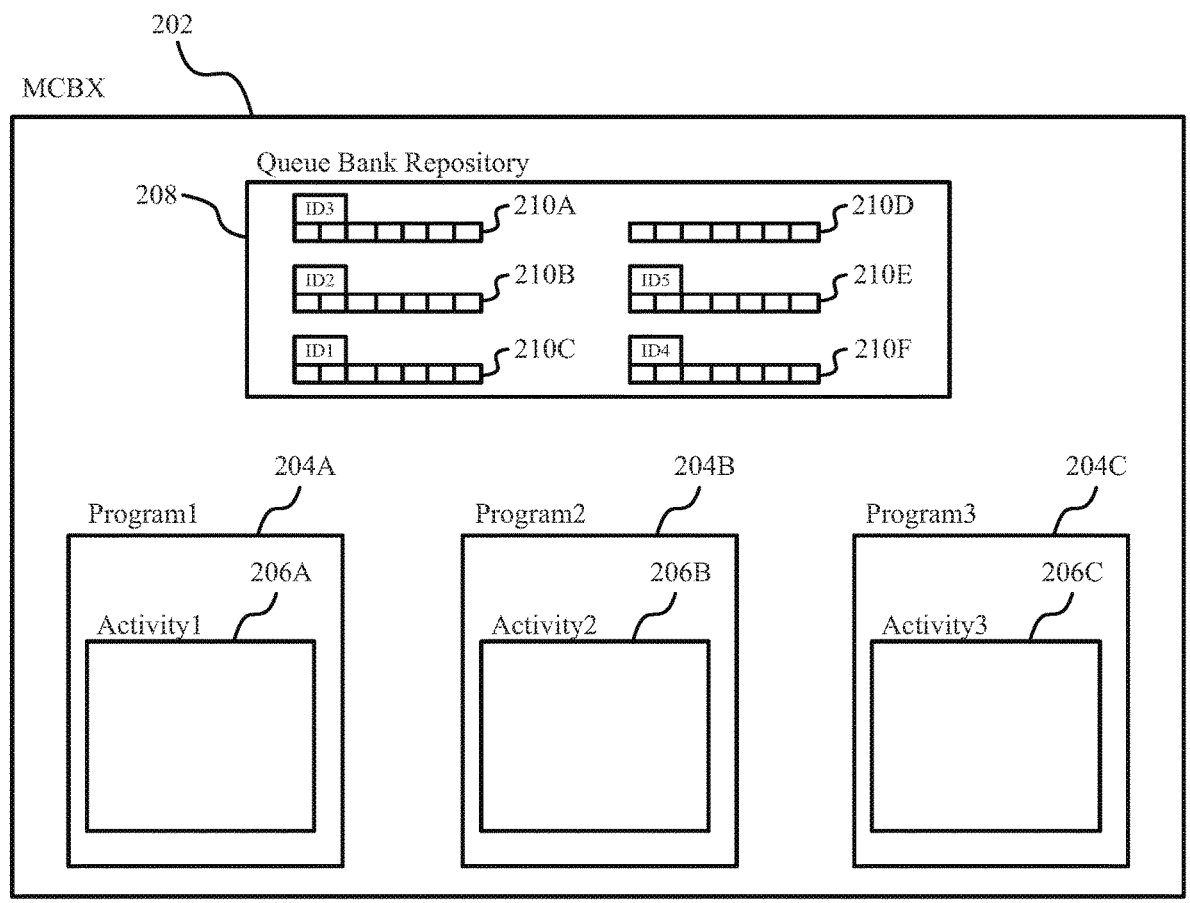

The server may, at block 106, place the first contiguous portion of memory in a memory repository to make the first contiguous portion of memory available for access by at least a second activity of the plurality of activities. At block 108, the server may assign an identifier to the first contiguous portion of memory. For example, as illustrated in FIG. 2C, after the first activity, such as activity 206A, transfers data associated with it, such as data 212, to the accessed first contiguous portion of memory, such as QB 210C, the accessed first contiguous portion of memory, such as QB 210C, may be placed in a memory repository, such as QBR 208, after which an identifier may be assigned to the first contiguous portion of memory, such as identifier ID1. Any QB 210 in a QBR 208 may be available to a plurality of activities 206, regardless of whether or not all the activities 206 are associated with the same executing program 204. Therefore, in one embodiment, the second activity may also be the first activity, such as activity 206A, while in a second embodiment, the second activity may be a different activity, such as activity 206B.

Figure 2D:
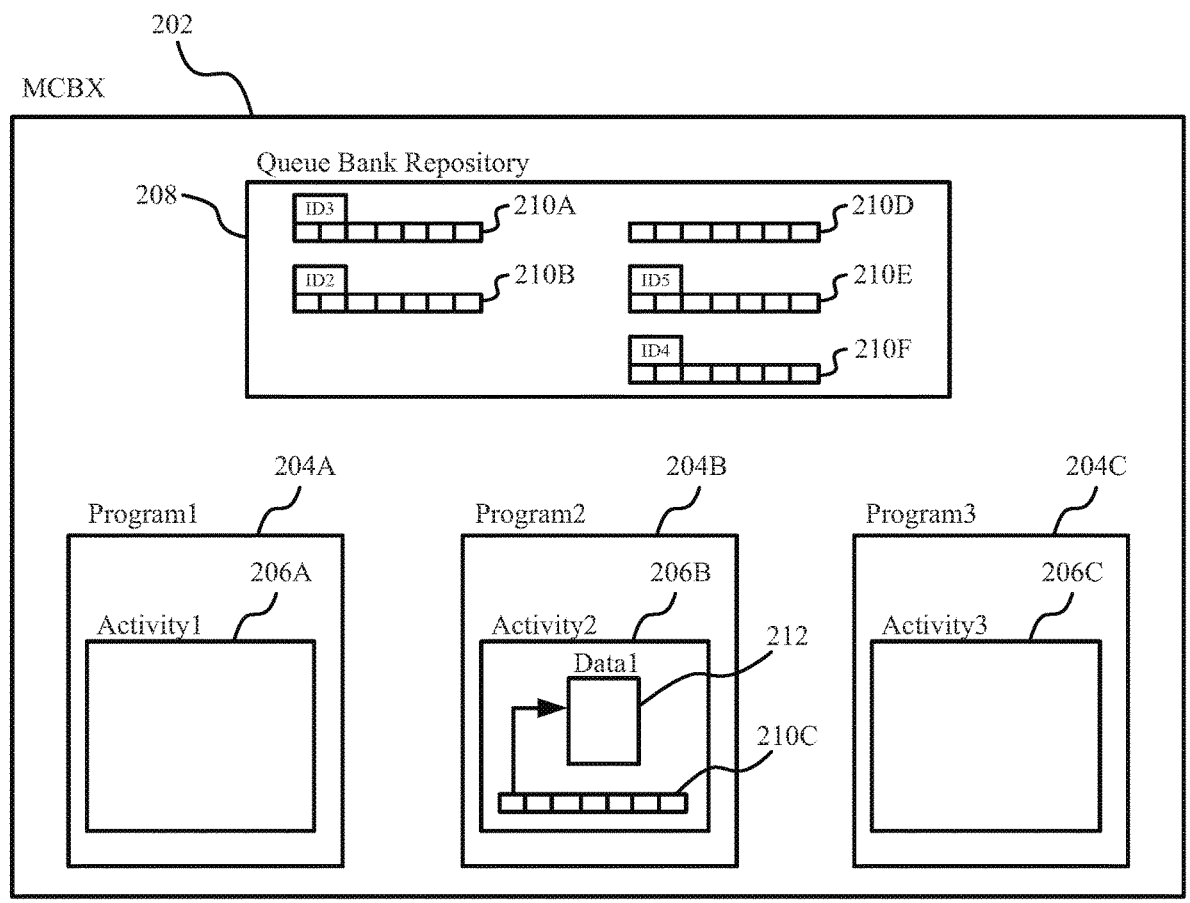

At block 110, the server may access the first contiguous portion of memory for the second activity, and at block 112, the server may transfer the data associated with the first activity from the first contiguous portion of memory to memory specifically associated with the second activity. FIG. 2D provides an illustration of an embodiment in which the second activity is different than the first activity. For example, FIG. 2D provides an illustration in which the first contiguous portion of memory, such as QB 210C, may be associated with the second activity, such as activity 206B, and data associated with the first activity, such as data 212, may be transferred from the first contiguous portion of memory, such as QB 210C, to the second activity, such as activity 206B.

In one embodiment, in order for the server to access the first contiguous portion of memory, such as QB 210C, for a second activity, the second activity may need to possess the identifier assigned to the first contiguous portion of memory, such as identifier ID1, when requesting access to the first contiguous portion of memory, such as QB 210C. In another embodiment, the second activity may not need to possess the identifier when requesting access to the first contiguous portion of memory.

In some embodiments, the data in the first contiguous portion of memory, such as data 212, may be removed after the first contiguous portion of memory, such as QB 210C, is accessed at least twice. For example, after the server transfers, at block 112, the data associated with the first activity from the first contiguous portion of memory to memory specifically associated with the second activity, the data may be removed from the first contiguous portion of memory. After the data in the first contiguous portion of memory is removed, the first contiguous portion of memory may be rendered unassigned, whereby an identifier is no longer assigned to the first contiguous portion of memory. When the contents of a QB 210 are removed and the QB 210 no longer has an identifier assigned to it, the QB 210 may be made available for access by another activity which seeks to store data in the QB 210.

In other embodiments, the data may not need to be transferred to memory specifically associated with a second activity in order to remove the data from the first contiguous portion of memory. For example, a second activity may request access to a QB 210 for the sole purpose of removing the contents from the QB 210 and not to receive the contents of the QB 210.

Figure 3:
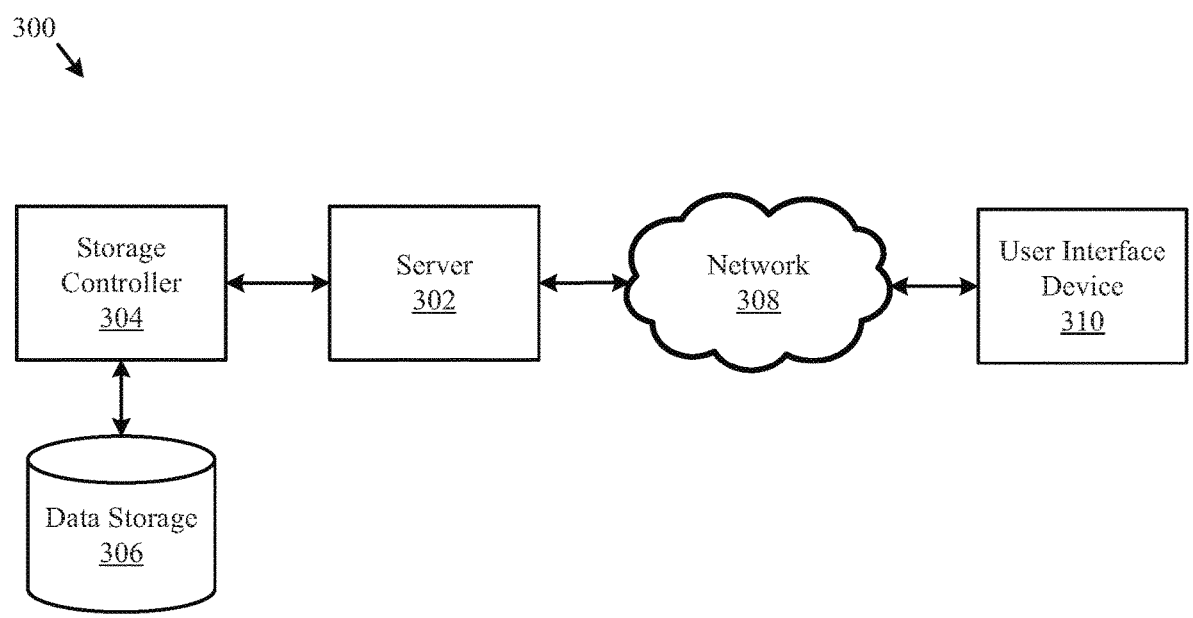
FIG. 3 is a block diagram illustrating a computer network according to one embodiment of the disclosure.

FIG. 3 illustrates one embodiment of a system 300 for an information system, including a system for internal temporary storage, transfer, and sharing of message data. The system 300 may include a server 302, a data storage device 306, a network 308, and a user interface device 310. The server 302 may also be a hypervisor-based system executing one or more guest partitions hosting operating systems with modules having server configuration information. In a further embodiment, the system 300 may include a storage controller 304, or a storage server configured to manage data communications between the data storage device 306 and the server 302 or other components in communication with the network 308. In an alternative embodiment, the storage controller 304 may be coupled to the network 308.

In one embodiment, the user interface device 310 is referred to broadly and is intended to encompass a suitable processor-based device such as a desktop computer, a laptop computer, a personal digital assistant (PDA) or tablet computer, a smartphone or other mobile communication device having access to the network 308. When the device 310 is a mobile device, sensors (not shown), such as a camera or accelerometer, may be embedded in the device 310. When the device 310 is a desktop computer the sensors may be embedded in an attachment (not shown) to the device 310. In a further embodiment, the user interface device 310 may access the Internet or other wide area or local area network to access a web application or web service hosted by the server 302 and may provide a user interface for enabling a user to enter or receive information.

The network 308 may facilitate communications of data between the server 302 and the user interface device 310. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 4:
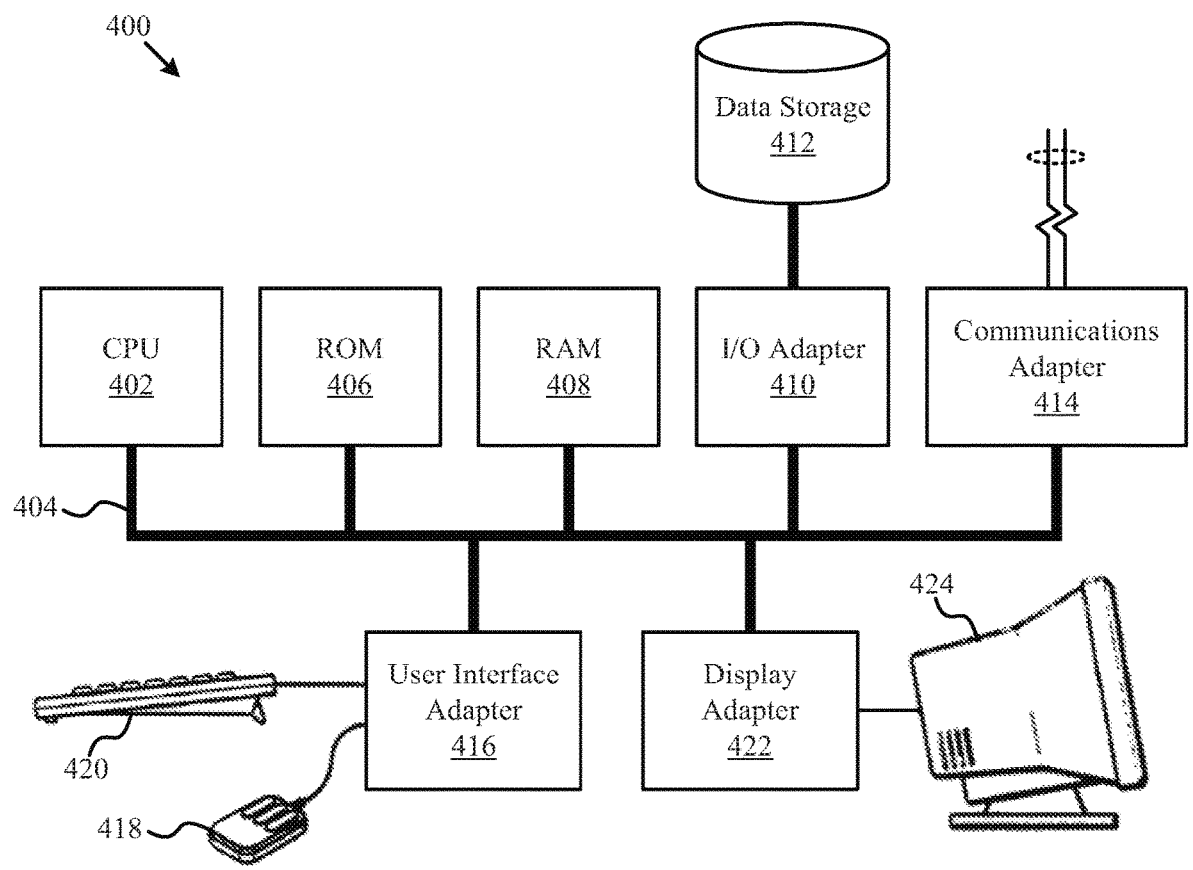
FIG. 4 is a block diagram illustrating a computer system according to one embodiment of the disclosure.

FIG. 4 illustrates a computer system 400 adapted according to certain embodiments of the server 302 and/or the user interface device 310. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computer system 400 also may include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to the network 308, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing device that may be adapted to perform the functions of the server 302 and/or the user interface device 310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 400 may be virtualized for access by multiple users and/or applications.

Figure 5A:
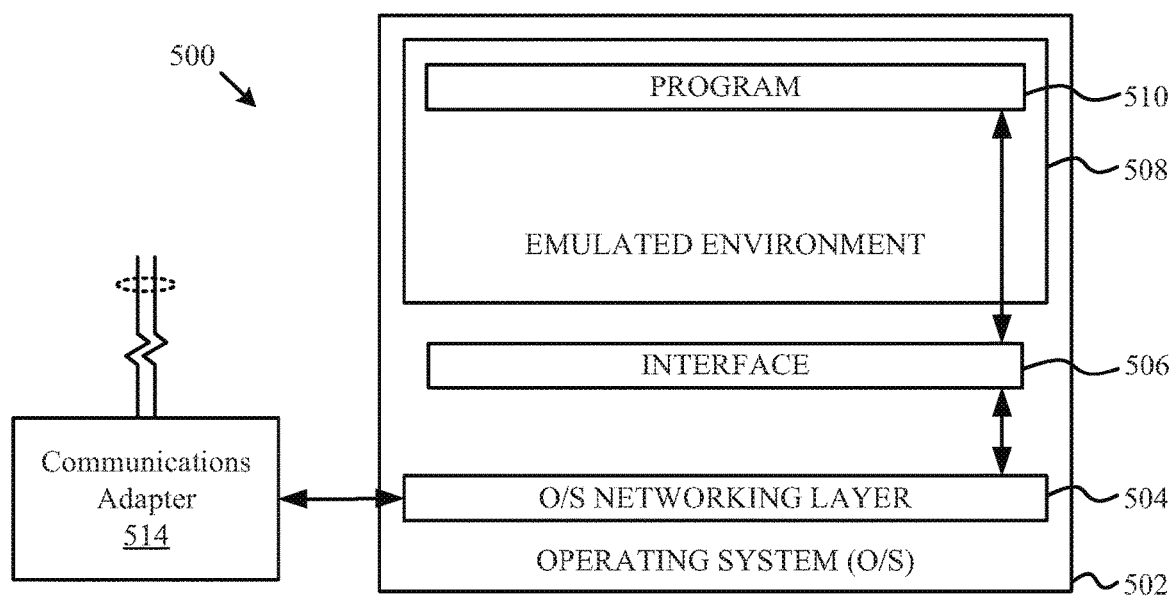
FIG. 5A is a block diagram illustrating a server hosting an emulated software environment for virtualization according to one embodiment of the disclosure.

FIG. 5A is a block diagram illustrating a server hosting an emulated software environment for virtualization according to one embodiment of the disclosure. An operating system 502 executing on a server includes drivers for accessing hardware components, such as a networking layer 504 for accessing the communications adapter 514. The operating system 502 may be, for example, Linux. An emulated environment 508 in the operating system 502 executes a program 510, such as Communications Platform (CPComm) or Communications Platform for Open Systems (CPCommOS). The program 510 accesses the networking layer 504 of the operating system 502 through a non-emulated interface 506, such as extended network input output processor (XNIOP). The non-emulated interface 506 translates requests from the program 510 executing in the emulated environment 508 for the networking layer 504 of the operating system 502.

Figure 5B:
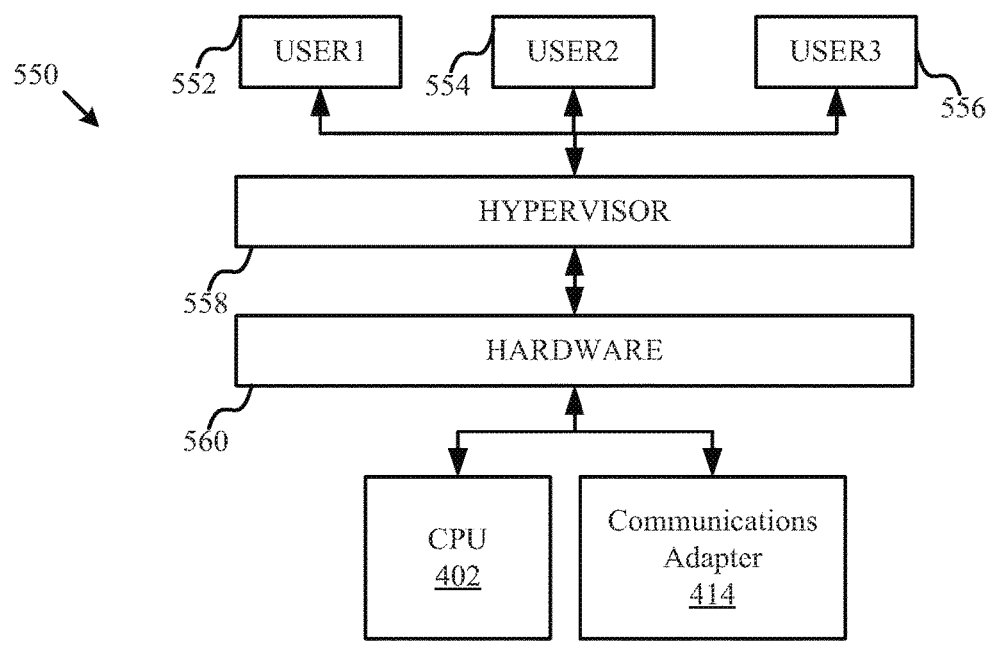
FIG. 5B is a block diagram illustrating a server hosting an emulated hardware environment according to one embodiment of the disclosure.

In another example, hardware in a computer system may be virtualized through a hypervisor. FIG. 5B is a block diagram illustrating a server hosting an emulated hardware environment according to one embodiment of the disclosure. Users 552, 554, 556 may access the hardware 560 through a hypervisor 558. The hypervisor 558 may be integrated with the hardware 560 to provide virtualization of the hardware 560 without an operating system, such as in the configuration illustrated in FIG. 5A. The hypervisor 558 may provide access to the hardware 560, including the CPU 402 and the communications adaptor 414.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for internal temporary storage, transfer, and sharing of message data, comprising:
   accessing, by a server, a first contiguous portion of memory for a first thread of a first program of a plurality of executing programs;
   transferring, by the server, data associated with the first thread into the first contiguous portion of memory;
   placing, by the server, the first contiguous portion of memory in a memory repository that includes a plurality of contiguous portions of memory selectively accessible to the plurality of executing programs, to make the first contiguous portion of memory available for access by at least a second thread of a second program of the plurality of executing programs;
   assigning, by the server, an identifier to the first contiguous portion of memory;
   accessing, by the server, the first contiguous portion of memory for the second thread;
   transferring, by the server, the data associated with the first thread from the first contiguous portion of memory to memory specifically associated with the second thread;
   removing the data from the first contiguous portion of memory after the first contiguous portion of memory is accessed at least twice; and
   rendering the first contiguous portion of memory unassigned after the data in the first contiguous portion of memory has been removed;
   wherein the method is implemented in a fixed-gate shared subsystem.

2. The method of claim 1, in which accessing the first contiguous portion of memory for the second thread comprises the second thread possessing the identifier and requesting access to the first contiguous portion of memory.

3. The method of claim 1, in which the data transferred into the first contiguous portion of memory comprises a complete message.

4. A computer program product, comprising:
   a non-transitory computer-readable medium comprising code to perform operations including:
      accessing, by a server, a first contiguous portion of memory for a first thread of a first program of a plurality of executing programs;
      transferring, by the server, data associated with the first thread into the first contiguous portion of memory;
      placing, by the server, the first contiguous portion of memory in a memory repository that includes a plurality of contiguous portions of memory selectively accessible to the plurality of executing programs, to make the first contiguous portion of memory available for access by at least a second thread of a second program of the plurality of executing programs;
      assigning, by the server, an identifier to the first contiguous portion of memory;
      accessing, by the server, the first contiguous portion of memory for the second thread;
      transferring, by the server, the data associated with the first thread from the first contiguous portion of memory to memory specifically associated with the second thread;
      removing the data from the first contiguous portion of memory after the first contiguous portion of memory is accessed at least twice; and
      rendering the first contiguous portion of memory unassigned after the data in the first contiguous portion of memory has been removed;
   wherein the computer program product comprises a fixed-gate shared subsystem.

5. The computer program product of claim 4, in which accessing the first contiguous portion of memory for the second thread comprises the second thread possessing the identifier and requesting access to the first contiguous portion of memory.

6. The computer program product of claim 4, in which the data transferred into the first contiguous portion of memory comprises a complete message.

7. An apparatus, comprising:
   a memory; and
   a processor coupled to the memory, in which the processor is configured to execute operations including:
      accessing, by a server, a first contiguous portion of memory for a first thread of a first program of a plurality of executing programs;
      transferring, by the server, data associated with the first thread into the first contiguous portion of memory;
      placing, by the server, the first contiguous portion of memory in a memory repository that includes a plurality of contiguous portions of memory selectively accessible to the plurality of executing programs, to make the first contiguous portion of memory available for access by at least a second thread of a second program of the plurality of executing programs;

assigning, by the server, an identifier to the first contiguous portion of memory;

accessing, by the server, the first contiguous portion of memory for the second thread;

transferring, by the server, the data associated with the first thread from the first contiguous portion of memory to memory specifically associated with the second thread;

removing the data from the first contiguous portion of memory after the first contiguous portion of memory is accessed at least twice; and rendering the first contiguous portion of memory unassigned after the data in the first contiguous portion of memory has been removed;

wherein the apparatus comprises a fixed-gate shared subsystem.

8. The apparatus of claim 7, in which accessing the first contiguous portion of memory for the second thread comprises the second thread possessing the identifier and requesting access to the first contiguous portion of memory.

9. The apparatus of claim 7, in which the data transferred into the first contiguous portion of memory comprises a complete message.

* * * * *